(12) United States Patent
Larsson et al.

(10) Patent No.: US 11,847,854 B2
(45) Date of Patent: Dec. 19, 2023

(54) OPTICAL FINGERPRINT SENSING SYSTEM WITH COMMON MODE COMPENSATION

(71) Applicant: FINGERPRINT CARDS ANACATUM IP AB, Gothenburg (SE)

(72) Inventors: Andreas Larsson, Herrljunga (SE); Frank Riedijk, Delft (NL)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 17/925,876

(22) PCT Filed: Jun. 10, 2021

(86) PCT No.: PCT/SE2021/050558
§ 371 (c)(1),
(2) Date: Nov. 17, 2022

(87) PCT Pub. No.: WO2021/262064
PCT Pub. Date: Dec. 30, 2021

(65) Prior Publication Data
US 2023/0090292 A1 Mar. 23, 2023

(30) Foreign Application Priority Data
Jun. 26, 2020 (SE) .................... 2050767-9

(51) Int. Cl.
*G06V 40/13* (2022.01)
*G06V 40/12* (2022.01)
*G06F 3/042* (2006.01)
(52) U.S. Cl.
CPC ........ *G06V 40/1318* (2022.01); *G06F 3/0421* (2013.01); *G06V 40/1365* (2022.01)

(58) Field of Classification Search
CPC .......... G06V 40/1318; G06V 40/1365; G06V 40/13; G06F 3/0421; G06F 3/042
See application file for complete search history.

(56) References Cited

U.S. PATENT DOCUMENTS

| 11,334,194 B2 | 5/2022 | Ding et al. |
| 2007/0109239 A1 | 5/2007 | den Boer et al. |

(Continued)

FOREIGN PATENT DOCUMENTS

| CN | 107563361 A | 1/2018 |
| CN | 207397289 | 5/2018 |

(Continued)

OTHER PUBLICATIONS

International Search Report and Written Opinion for International Application No. PCT/SE2021/050558, dated Aug. 13, 2021.

(Continued)

*Primary Examiner* — Premal R Patel
(74) *Attorney, Agent, or Firm* — Westman, Champlin & Koehler, P.A.

(57) ABSTRACT

A fingerprint sensing system for sensing a finger surface of a finger, comprising: a plurality of pixel elements, each pixel element in the plurality of pixel elements comprising: a photo-sensitive element configured to provide a current including a fingerprint signal current component and a common-mode signal current component; and an integrating capacitor including a first electrode coupled to the photo-sensitive element for receiving the current provided by the photo-sensitive element, and a second electrode; and a current source arrangement coupled to the first electrode of the integrating capacitor of each pixel element in the plurality of pixel elements.

15 Claims, 7 Drawing Sheets

(56) References Cited

U.S. PATENT DOCUMENTS

| | | | |
|---|---|---|---|
| 2012/0313913 A1 | 12/2012 | Shiraki et al. | |
| 2016/0103513 A1* | 4/2016 | Yang | G09G 3/3291 345/76 |
| 2018/0294376 A1 | 10/2018 | Tian et al. | |
| 2020/0225806 A1* | 7/2020 | Ding | G06F 3/0416 |
| 2021/0334502 A1* | 10/2021 | Lee | H10K 59/12 |

FOREIGN PATENT DOCUMENTS

| | | |
|---|---|---|
| CN | 108133194 A | 6/2018 |
| CN | 111052730 | 4/2020 |
| EP | 3200183 A1 | 8/2017 |
| WO | 2020020310 A1 | 1/2020 |

OTHER PUBLICATIONS

Extended European Search Report from European Patent Application No. 21829995.6, dated Sep. 18, 2023.

* cited by examiner

OPTICAL FINGERPRINT SENSING SYSTEM WITH COMMON MODE COMPENSATION

CROSS-REFERENCE TO RELATED APPLICATION

This Application is a Section 371 National Stage Application of International Application No. PCT/SE2021/050558, filed Jun. 10, 2021, which claims priority to Swedish Patent Application No. 2050767-9 filed on Jun. 26, 2020, and published as WO 2021/262064 A1 on Dec. 30, 2021, in English, the entire contents of which are hereby incorporated by reference in their entireties.

FIELD OF THE INVENTION

The present invention relates to a fingerprint sensing system for sensing a finger surface of a finger, comprising a plurality pixel elements, each including a photo-sensitive element.

BACKGROUND OF THE INVENTION

Fingerprint sensing systems are widely used as means for increasing the convenience and security of electronic devices, such as mobile phones etc. In various electronic devices having a display, it may be desirable to provide for fingerprint sensing within the area occupied by the display. It may also be desirable to provide for fingerprint sensing across a relatively large area of the display. For this and other applications, it may be suitable to use a so-called optical fingerprint sensing system, in which each pixel element comprises a photo-sensitive element. In one example of such a fingerprint sensing system, the fingerprint sensing system may have a configuration with a plurality of conductive selection lines arranged in parallel to each other; a plurality of conductive read-out lines arranged in parallel to each other and crossing the selection lines; selection circuitry coupled to each selection line in the plurality of selection lines, and controllable to provide a selection signal on at least one selected selection line in the plurality of selection lines; and a plurality of pixel elements, each being formed at a respective intersection between a selection line in the plurality of selection lines and a read-out line in the plurality of read-out lines.

This sensor configuration can be at least partly realized using relatively cost-efficient materials and technologies, such as TFT (thin film transistor) technology on a glass or plastic substrate.

It should, however, be noted that other fingerprint sensing system configurations may be feasible, such as CMOS-based optical fingerprint sensing systems.

Due to the relatively weak signals often involved in fingerprint sensing, it would be desirable to provide for improved quality of the signals provided by the fingerprint sensing system.

SUMMARY

It is an object of the present invention to provide an improved fingerprint sensing system, in particular a fingerprint sensing system providing for improved signal quality.

According to the present invention, it is therefore provided a fingerprint sensing system for sensing a finger surface of a finger, comprising: a plurality of pixel elements, each pixel element in the plurality of pixel elements comprising: a photo-sensitive element configured to provide a current including a fingerprint signal current component and a common-mode signal current component; and an integrating capacitor including a first electrode coupled to the photo-sensitive element for receiving the current provided by the photo-sensitive element, and a second electrode; and a current source arrangement coupled to the first electrode of the integrating capacitor of each pixel element in the plurality of pixel elements.

The fingerprint signal current component may be dependent on the distance between the finger surface and the photo-sensitive element of each pixel element. The fingerprint signal current component of each pixel element can therefore provide an indication of the fingerprint pattern of the finger surface. The common-mode signal current component may be substantially independent of the distance between the finger surface and the photo-sensitive element. The common-mode signal may include a so-called dark current and/or current resulting from ambient light. The contribution from either of these common-mode currents may be dominant depending on the application and/or ambient conditions.

It should be noted that the photo-sensitive element may, for example, be a photo-diode or a transistor including a photo-sensitive PN-junction, and that the integrating capacitor in each pixel element may be at least partly provided in the form of a junction capacitance of the photo-diode or transistor. Alternatively or in combination, the integrating capacitor may be provided as a metal-insulator-metal capacitor or any other suitable capacitor.

The first electrode and the second electrode of the integrating capacitor may be conductively separated by a dielectric material. The second electrode may be coupled to a reference potential of the fingerprint sensing system. It should be noted that the terms "first electrode" and "second electrode" are intended to be interpreted functionally as conducting or semiconducting structures where charge can accumulate. In particular, the first electrode and the second electrode need not be metallic.

The current source arrangement may be controllable to provide a compensation current to the first electrode of the integrating capacitor of the pixel element, to at least partly compensate for the common-mode signal current component.

The present invention is based on the realization that it may be beneficial to provide for compensation of a common-mode signal current component early in the measurement chain, and that a particularly suitable position in the measurement chain is at the first electrode of the integrating capacitor of each pixel element. Hereby, the risk of saturating the integrating capacitor in the pixel element, as well as downstream measurement circuitry, such as an amplifier and/or an analog-to-digital converter may be reduced, which provides for improved quality of the signals provided by the fingerprint sensing system, which in turn provides for an improved measurement performance of the fingerprint sensing system. Furthermore, since the common-mode signal current may be strongly temperature dependent, the useable temperature range of the fingerprint sensing system may be extended.

According to embodiments of the present invention, the current source arrangement may comprise: a voltage source arrangement; and a plurality of voltage-to-current converters, each voltage-to-current converter in the plurality of voltage-to-current converters having: an input coupled to the voltage source arrangement; and an output coupled to the first electrode of the integrating capacitor comprised in a respective pixel element in the plurality of pixel elements.

The output may advantageously be electrically conductively connected to the first electrode of the integrating capacitor.

There may be one voltage-to-current converter for each pixel element or one voltage-to-current converter may serve each pixel element in a group of pixel elements.

Furthermore, the voltage source arrangement may comprise a single voltage source supplying a voltage to each voltage-to-current converter in the plurality of voltage-to-current converters, or the voltage source arrangement may include a plurality of voltage sources. For instance, each voltage source in a plurality of voltage sources may provide a voltage adapted for a given set of pixel elements, with respect to timing and/or magnitude.

According to embodiments, each voltage-to-current converter may be a capacitor, which is a relatively simple component that may be easy to form when the fingerprint sensing system is produced. Furthermore, the current consumption can be kept relatively low. It should, however, be noted that the voltage-to-current converter may also be realized by other circuit elements, such as a transistor and/or a resistor.

In the embodiments where each voltage-to-current converter is a capacitor, the input of the voltage-to-current converter may be a first electrode of the voltage-to-current converter capacitor, and the output of the voltage-to-current converter may be a second electrode that is conductively separated from the first electrode of the voltage-to-current converter capacitor by a dielectric material.

According to embodiments, the voltage source arrangement may advantageously be configured to output a voltage that varies over time. In particular, the voltage may advantageously vary over time during a predefined integration time during which the integrating capacitor in a pixel element is coupled to the photo-sensitive element for receiving the current provided by the photo-sensitive element of the pixel element. Hereby, the common-mode current component can be dynamically compensated for.

Advantageously, the voltage source arrangement may be configured to output a voltage that gradually increases or decreases over time within the predefined integration time period. Whether the gradual change of the voltage should preferably be an increase or decrease, would typically depend on the configuration of the photo-sensitive element. The increase or decrease may advantageously take place during the entire predefined integration time period.

In embodiments, the fingerprint sensing system may comprise common-mode sensing circuitry configured to sense at least one property influencing the common-mode signal current component. The voltage control circuitry may be coupled to the common-mode sensing circuitry; and be configured to acquire a signal from the common-mode sensing circuitry and to control operation of the at least one controllable voltage source based on the signal from the common-mode sensing circuitry.

The common-mode sensing circuitry may advantageously include a photo-sensitive element, which may preferably have the same configuration and properties as the photo-sensitive elements in the pixel elements. The common-mode sensing circuitry may advantageously be substantially identical to each pixel element, with the possible exception of being shielded from light. Alternatively, or in combination, the common-mode sensing circuitry may be configured to sense one or more other properties, such as a property indicative of a temperature of the pixel elements.

In embodiments and/or applications where the dark current is expected to be the main contributor to the common-mode signal current component, an opaque structure may be provided for shielding the photo-sensitive element in the common-mode sensing circuitry from light. In other embodiments, the photo-sensitive element in the common-mode sensing circuitry may be exposed to light, and the signal from the common-mode sensing circuitry may be indicative of variations in background light, which may influence the measurement as a common-mode signal current component.

According to various embodiments, furthermore, the common-mode sensing circuitry may include: a first photo-sensitive element arranged at a first location in relation to a given pixel element in the plurality of pixel elements; and a second photo-sensitive element arranged at a second location, different from the first location, in relation to the given pixel element.

In these embodiments, possibly different unknown common-mode signal component properties in different parts of the fingerprint sensing system can be compensated for.

Furthermore, the first controllable voltage source may be coupled to a first set of voltage-to-current converters in the current source arrangement; and the second controllable voltage source may be coupled to a second set of voltage-to-current converters in the current source arrangement. For instance, the plurality of pixel elements may be arranged in an array with a plurality of rows/columns, the first set may be related to a first set of the rows/columns, and the second set may be related to a second set of the rows/columns different from the first set.

The fingerprint sensing system according to embodiments of the present invention may advantageously be implemented using TFT-technology, providing for a cost-efficient fingerprint sensing system exhibiting a large sensing area.

For improved performance, some functionality of the fingerprint sensing system according to embodiments of the present invention may be provided using CMOS technology, advantageously in the form of an ASIC coupled to a TFT-module including at least selection lines, read-out lines, the pixel elements, and the plurality of capacitors in the current source arrangement. Further, the TFT-module may advantageously include common-mode sensing circuitry.

In particular, the above-mentioned voltage control circuitry may be comprised in a CMOS-component, such as an ASIC, which may provide the advantage of more compact circuitry with more well-controlled and less temperature-sensitive properties.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS

In the present detailed description, various embodiments of the fingerprint sensing system according to the present invention are mainly described with reference to a fingerprint sensing system that is at least partly implemented using TFT-technology. Furthermore, the fingerprint sensing system is mainly described as being arranged under a display panel. However, this should not be construed as limiting the present invention, as defined by the claims. According to embodiments, the fingerprint sensing system may be realized using other technology, such as CMOS-technology. Furthermore, the fingerprint sensing system need not be arranged under a display panel, but may be used in other configurations, such as under a cover glass plate or over a display panel etc.

Figure 1:
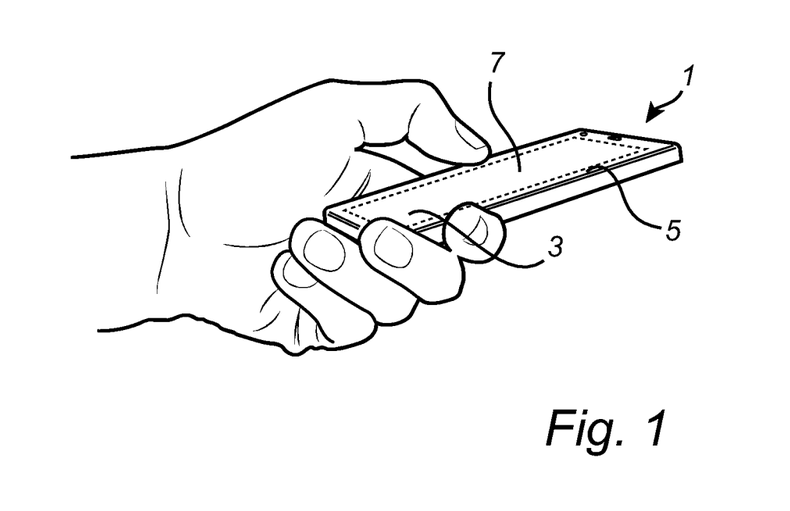
FIG. 1 is an illustration of an exemplary electronic device comprising a fingerprint sensing system according to an embodiment of the present invention, in the form of a mobile phone.

Turning now to the drawings and in particular to FIG. 1, there is schematically illustrated an example of an electronic device 1 configured to apply the concept according to the present disclosure, in the form of a mobile device with an integrated in-display fingerprint sensing system 3 and a display panel 5 with a touch screen interface 7. The fingerprint sensing system 3 may, for example, be used for unlocking the mobile device 1 and/or for authorizing transactions carried out using the mobile device 1, etc.

The fingerprint sensing system 3 is here shown to be smaller than the display panel 5, but still relatively large, e.g. a large area implementation. In another advantageous implementation the fingerprint sensing system 3 may be the same size as the display panel 5, i.e. a full display solution. Thus, in such case the user may place his/her finger anywhere on the display panel for biometric authentication. The fingerprint sensing system 3 may in other possible implementations be smaller than the depicted fingerprint sensing system, such as providing a hot-zone implementation.

Preferably and as is apparent to the skilled person, the mobile device 1 shown in FIG. 1 may further comprise a first antenna for WLAN/Wi-Fi communication, a second antenna for telecommunication communication, a microphone, a speaker, and a phone control unit. Further hardware elements are of course possibly comprised with the mobile device.

It should furthermore be noted that the invention may be applicable in relation to other types of electronic devices, such as smart watches, laptops, tablet computers, etc.

Figure 2:
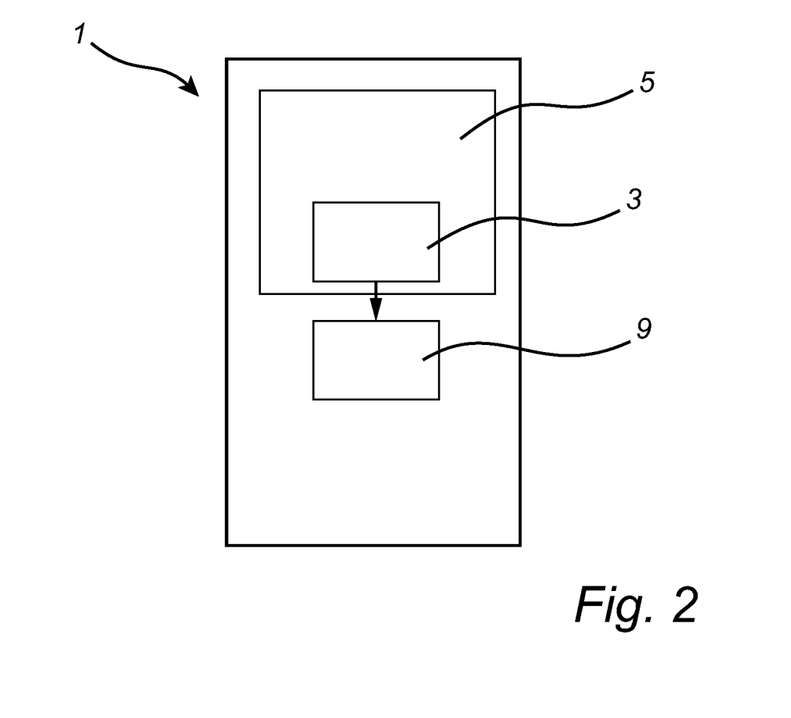
FIG. 2 is a schematic block diagram of the electronic device in FIG. 1.

FIG. 2 is a schematic block diagram of the electronic device 1 in FIG. 1. The electronic device 1 comprises a transparent display panel 5 and a fingerprint sensing system 3 conceptually illustrated to be arranged under the transparent display panel 5. Furthermore, the electronic device 1 comprises processing circuitry such as control unit 9 coupled to the fingerprint sensing system 3, and configured to perform an authentication based on signals provided by the fingerprint sensing system 3. The control unit 9 may be stand-alone control unit of the electronic device 9, e.g. a device controller. Alternatively, the control unit 9 may be comprised in the fingerprint sensing system 3.

Figure 3:
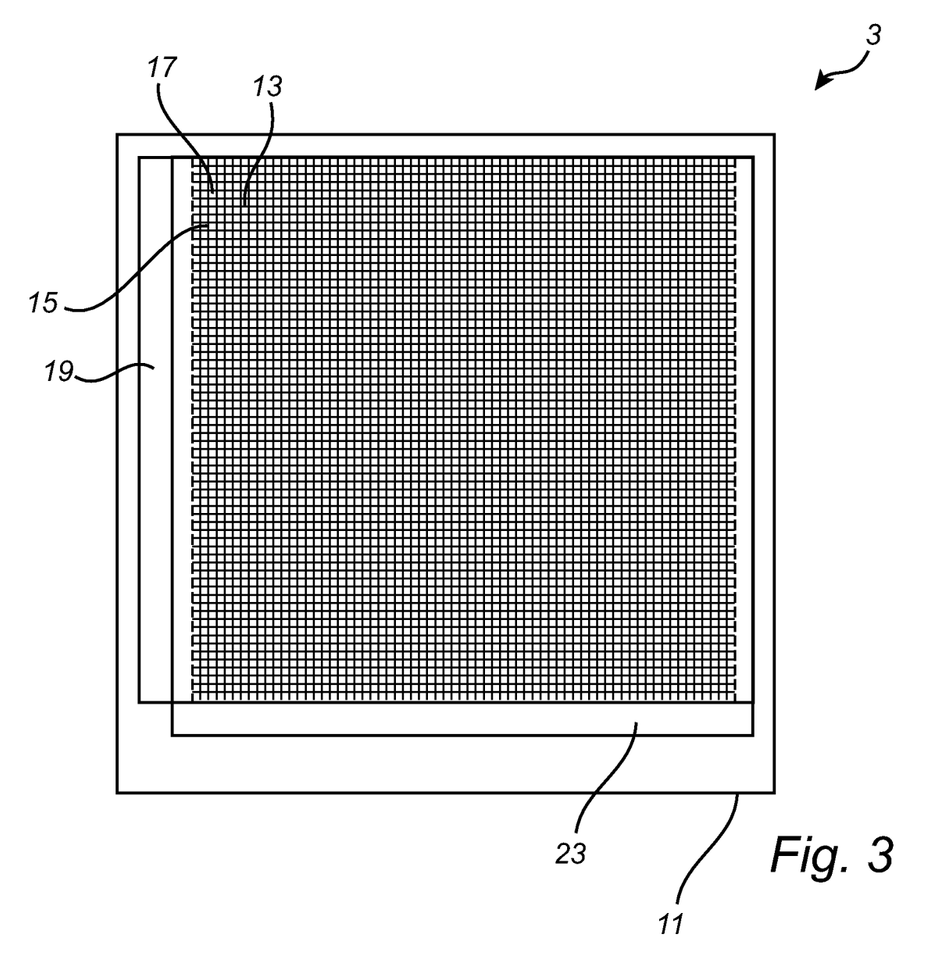
FIG. 3 schematically illustrates a fingerprint sensing system according to a first example embodiment of the present invention.

A fingerprint sensing system 3 according to a first example embodiment of the present invention will now be described with reference to FIG. 3. As is schematically indicated in FIG. 3, the fingerprint sensing system 3 comprises structures formed on a substrate or carrier 11. In particular in embodiments where the fingerprint sensing system 3 is primarily manufactured using TFT-techniques, which are per se known to those skilled in the art, the carrier 11 may advantageously be made of glass or plastic. On the substrate 11 are formed a plurality of conductive selection lines 13 and a plurality of conductive read-out lines 15. The selection lines 13 are arranged in parallel to each other, and the read-out lines 15 are arranged in parallel to each other and crossing the selection lines 13. The selection lines 13 are conductively separated from the read-out lines 15, typically by a dielectric layer deposited between a first conductive layer including the selection lines 13 and a second conductive layer including the read-out lines 15. A plurality of pixel elements 17, here forming a pixel element array, are formed at respective intersections between the selection lines 13 and the read-out lines 15. In addition to the selection lines 13 and the read-out lines 15, the fingerprint sensing system 3 according to the first example embodiment in FIG. 3 comprises selection circuitry 19 coupled to each of the selection lines 13, read-out circuitry 23 coupled to each read-out line 15, and a current source arrangement (not visible in FIG. 3) for common-mode signal mitigation.

Figure 4A:
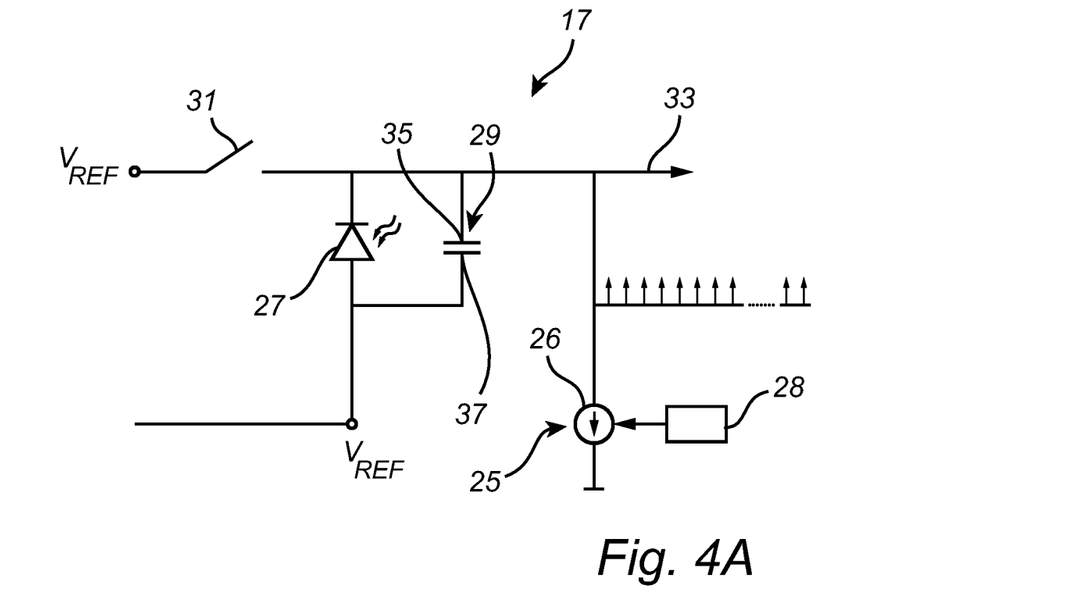
FIG. 4A is a schematic illustration of a pixel element comprised in the fingerprint sensing system in FIG. 3 and a first example configuration of a current source arrangement for common-mode mitigation.

FIG. 4A is a simplified schematic illustration of a pixel element 17 comprised in the fingerprint sensing system 3 in FIG. 3 and a first example configuration of a current source arrangement 25 for common-mode mitigation. Referring to FIG. 4A, each pixel element 17 in the fingerprint sensing system 3 comprises a photo-sensitive element 27, here in the form of a photo-diode, an integrating capacitor 29, a reset switch 31, and an output 33 for providing a pixel signal to the read-out circuitry 23. The integrating capacitor 29, which may be implemented as the junction of the photo-diode and/or as a metal-insulator-metal capacitor, or any other suitable capacitor, has a first electrode 35 coupled to the photo-sensitive element 27, and a second electrode 37.

When a finger surface of a finger is arranged on a sensing surface adjacent to the pixel elements 17, the amount of light reaching the photo-sensitive element 27 in each pixel element 17 will depend on the local distance between the finger surface and the sensing surface, as is per se well known in the art. When light is incident on the photo-sensitive element 27, the photo-sensitive element will generate a photo-current indicative of the intensity of light incident on the photo-sensitive element 27. To define the start of exposure of the pixel element, the reset switch 31 is opened. With the reset switch 31 opened as indicated in FIG. 4A, the current provided by the photo-sensitive element 27 is accumulated as charge in the integrating capacitor 29 resulting in a voltage across the integrating capacitor 29 that is indicative of the integrated current provided by the photo-sensitive element 27. At the end of the exposure, after a predefined or adaptive exposure time, the reset switch 31 is closed to equalize the charge accumulated in the integrating capacitor 29 during the exposure time. The pixel signal provided at the output 33 may be a voltage or a current that is indicative of the voltage across the integrating capacitor 29 at the end of the exposure time.

In practice, however, the photo-sensitive element 27 may not only provide a current that is useful for determining a fingerprint representation, but also a common-mode signal current component that does not carry useful fingerprint information. The common-mode signal current component may, for example, include a so-called dark current that is provided by the photo-sensitive element 27 without any light incident thereon, or a current that results from leakage of stray light that may be more or less unrelated to the fingerprint pattern. For example, pixel elements close to a periphery of an area of contact between the finger surface and the sensing surface may receive ambient light coming in from the side or through the finger tissue. In particular the dark current may exhibit a significant temperature dependence.

As a result of the presence and variability of the above-mentioned common-mode signal current component, a pre-defined exposure time may result in saturation of the integrating capacitor 29 for certain temperatures, or positions on the sensing area, or variations in the process for manufacturing the photo-sensitive element 27 and other parts of the fingerprint sensing system 3. Such saturation of the integrating capacitor 29 may be difficult to correctly compensate for using circuitry downstream of the pixel element 17. Therefore, the fingerprint sensing system according to various embodiments of the present invention comprises a current source arrangement 25 comprising a controllable current source 26 coupled to the first electrode 35 of the integrating capacitor 29 of each pixel element 17. In FIG. 4A this is schematically represented by the connection between the controllable current source 26 and the first electrode 35 of the integrating capacitor 29 of the illustrated pixel element 17 and arrows indicating couplings to the first electrodes of the integrating capacitors of additional pixel elements.

During the above-mentioned exposure time, the current source arrangement 25 may be controlled to provide a current to at least partly compensate for (cancel out) the common-mode signal current component provided by the photo-sensitive element 27. The compensation current provided by the current source arrangement 25 may therefore be of opposite sign (opposite direction) as the current from the photo-sensitive element 27.

Due to the gradually increasing voltage across the integrating capacitor 29 during the exposure time, the current provided by the photo-sensitive element 27 may decrease or increase over time during the exposure time depending on how the photo-sensitive element 27 is biased. In the example configuration illustrated in FIG. 4A, the current provided by the photo sensitive element 27 would typically decrease over time during the exposure time. It may be beneficial to control the current source arrangement 25 to exhibit a similar variation over time.

The current source arrangement 25 may be controlled in various ways. In some embodiments, the control of the current source arrangement 25 may be predefined based on, for example, known characteristics of the photo-sensitive element 27 and/or calibration. Additionally, the control may have a predefined dependence on a temperature of the pixel elements 17, which may, for example, be based on a characterization of the fingerprint sensing system.

In other embodiments, the control of the current source arrangement 25 may be based on real-time sensing of at least one property influencing the common-mode signal current component. One such property may be the temperature, and another such property may be the current provided by a photo-sensitive element that is shielded from light.

In either case, the current source arrangement 25 may comprise control circuitry 28 for controlling operation of the controllable current source 26. This control circuitry 28 may, for example, control the amplitude and/or timing and/or behavior over time during the exposure/integration time of the compensation signal output by the current source arrangement 25.

Figure 4B:
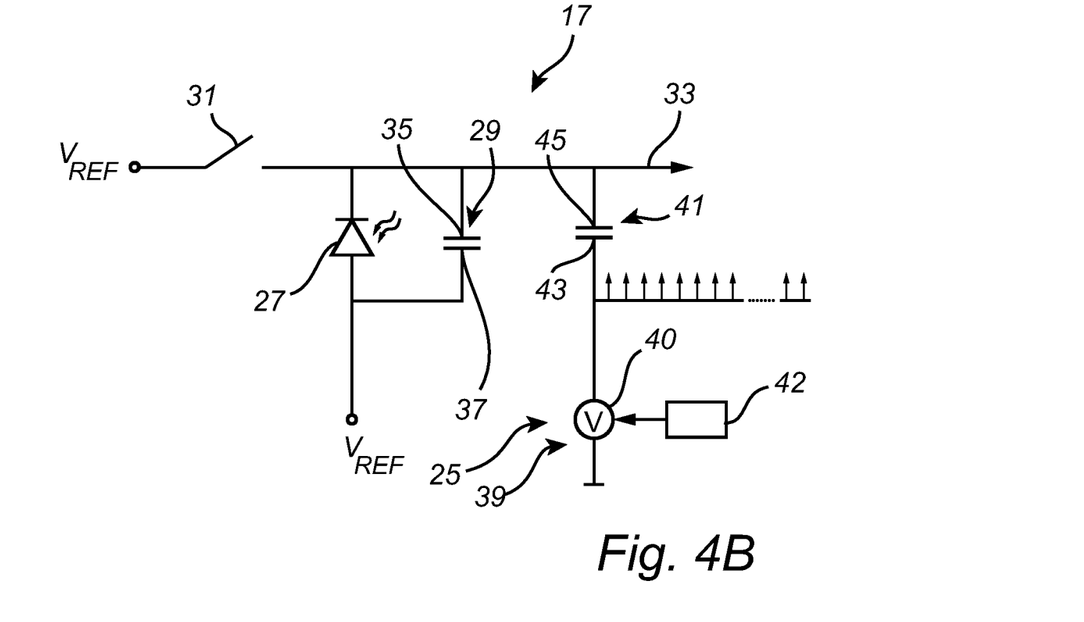
FIG. 4B is a schematic illustration of a pixel element comprised in the fingerprint sensing system in FIG. 3 and a second example configuration of a current source arrangement for common-mode mitigation.

A second example configuration of a current source arrangement for common-mode mitigation will now be described with reference to FIG. 4B. Referring to FIG. 4B, the current source arrangement 25 comprises a voltage source arrangement 39 and a plurality of voltage-to-current converters. The voltage source arrangement 39 is here seen as comprising a controllable voltage source 40 and voltage control circuitry 42, and the voltage-to-current converters are here represented by a voltage-to-current converter capacitor 41 having an input 43 coupled to the controllable voltage source 40 and an output 45 coupled to the first electrode 35 of the integrating capacitor 29 in the pixel element 17.

The voltage source arrangement 39 is configured to output a voltage that varies over time, and by controlling the voltage source arrangement 39 to output such a time-varying voltage, the voltage-to-current converter capacitor 41 will provide a compensation current to the first electrode 35 of the integrating capacitor 29 in the pixel element 17. The control of the controllable voltage source arrangement 39 can be carried out analogously to what was described above for the controllable current source in the embodiment in FIG. 4A. Accordingly, the voltage control circuitry 42 may control operation of the controllable voltage source 40. The voltage control circuitry 42 may, for example, control the amplitude and/or timing and/or behavior over time during the exposure/integration time of the compensation signal output by the current source arrangement 25, by controlling the voltage provided by the controllable voltage source 40.

Figure 5A:
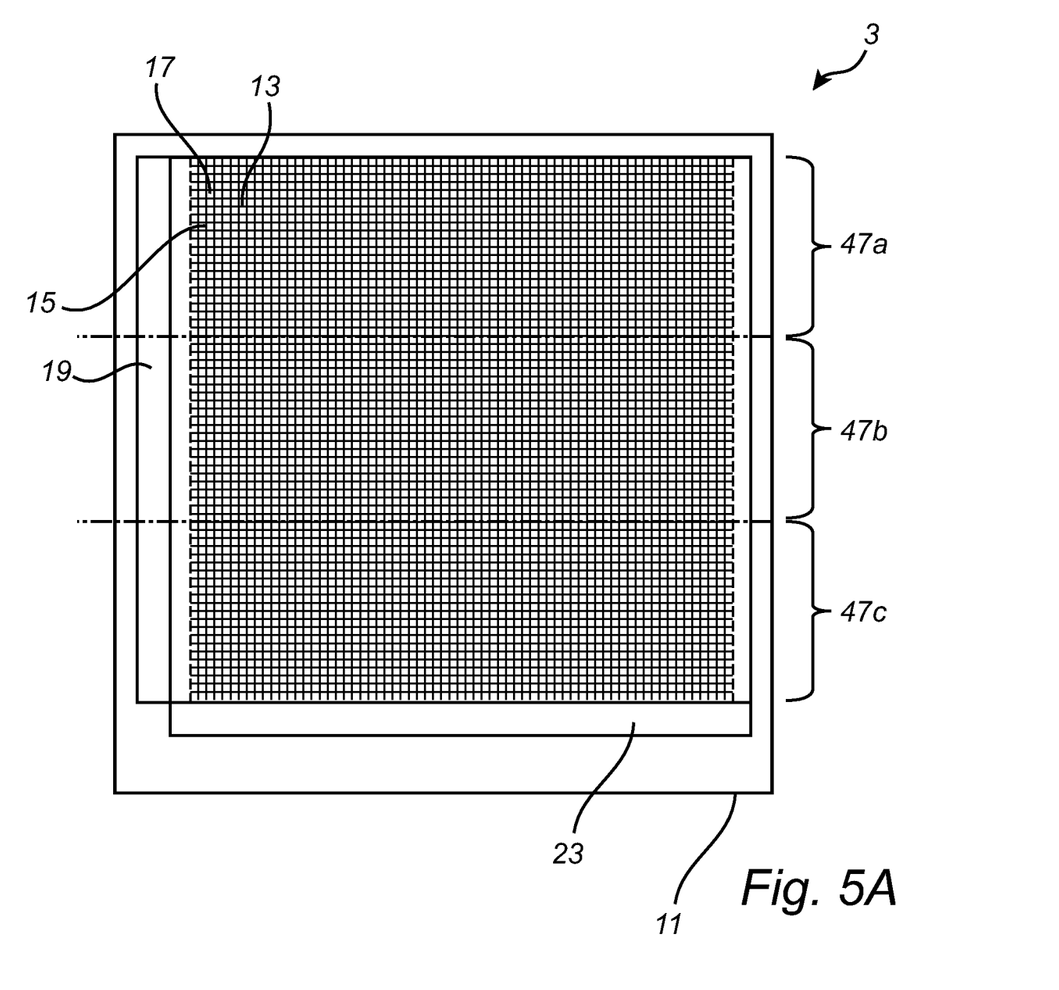
FIGS. 5A-B schematically illustrate a fingerprint system according to a second example embodiment of the present invention.
Figure 5B:
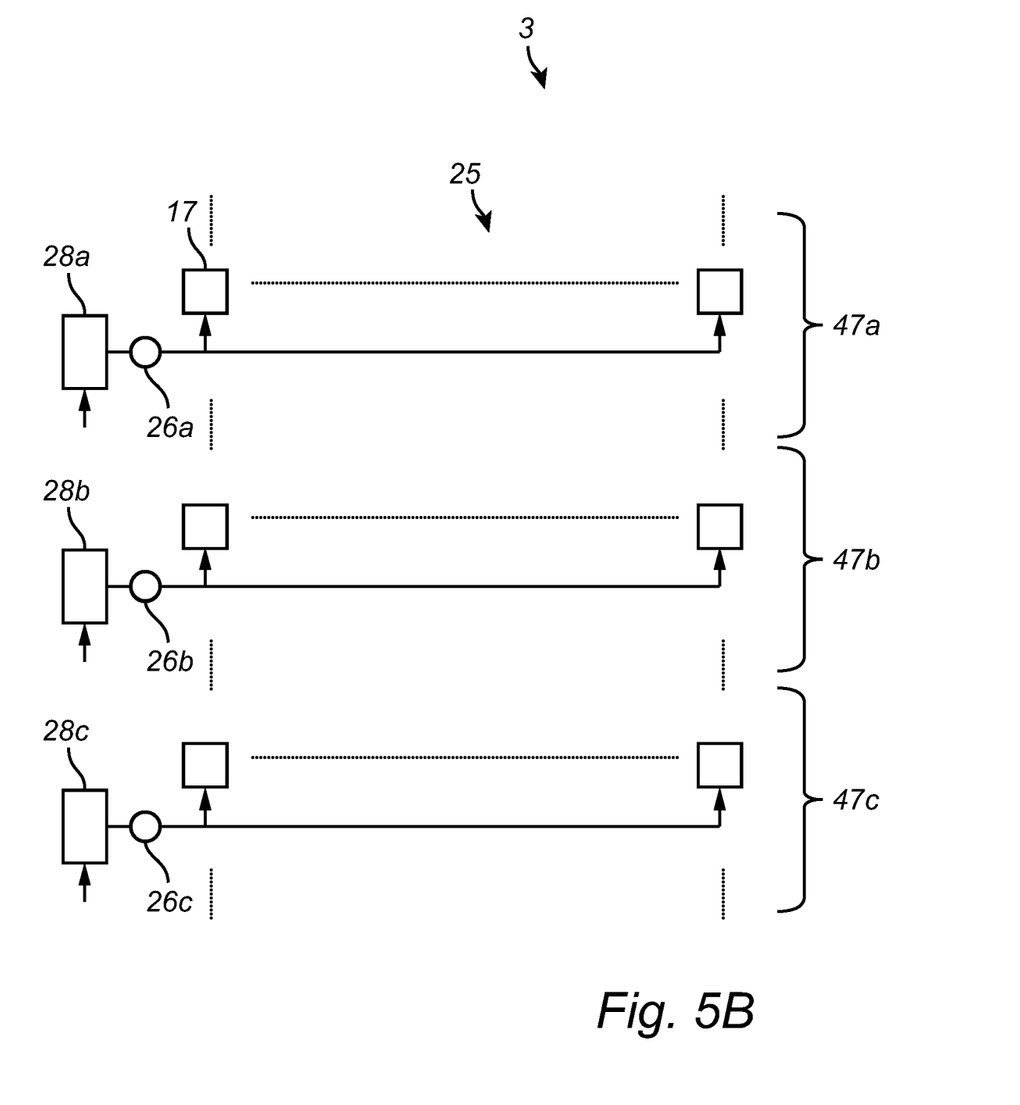

FIGS. 5A-B schematically illustrate a fingerprint system according to a second example embodiment of the present invention, in which different common-mode current compensation is applied in different portions of the fingerprint sensing array.

Referring first to FIG. 5A, the pixel elements 17 in the sensing array are arranged in three exemplary zones 47*a-c* that may be controlled to be exposed at different points in time. The fingerprint sensing system 3 can be said to apply a so-called rolling shutter.

In this configuration, which is schematically shown in FIG. 5B, the above-described current source arrangement may advantageously be capable of providing a common-mode compensation current with at least different timings for the different zones 47*a-c*. To that end, the current source arrangement 25 may comprise at least one respective controllable current source 26*a-c*, and at least one respective current control circuitry 28*a-c* for each zone 47*a-c* of pixel elements. The provision of the common-mode compensation current may be synchronized with the different exposure times of the different zones 47*a-c* using the current control circuitry 28*a-c*. The configuration of the current source arrangement 25 indicated in FIG. 5B may be replaced by the configuration of the current source arrangement 25 described above with reference to FIG. 4B.

Figure 6A:
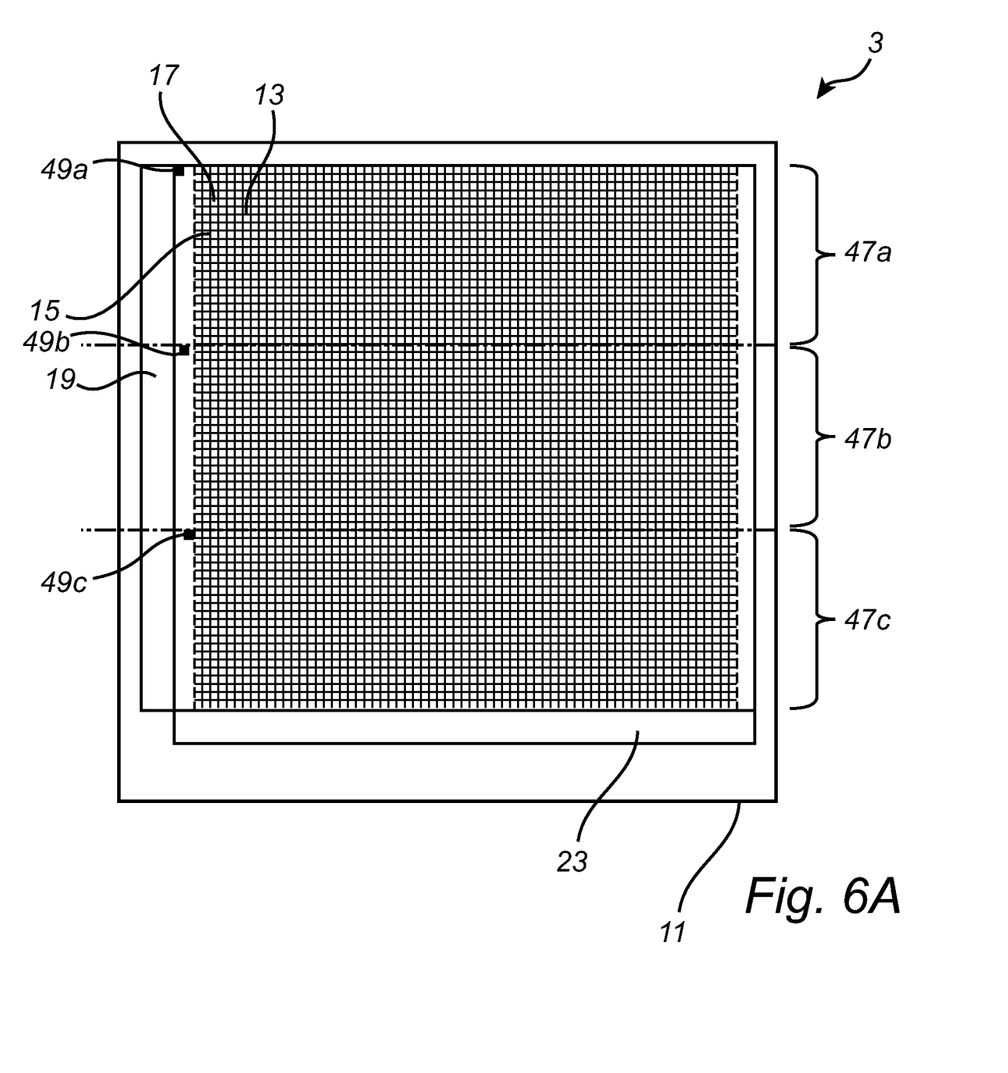
FIGS. 6A-B schematically illustrate a fingerprint system according to a third example embodiment of the present invention.

Turning now to FIG. 6A, the pixel elements 17 in the sensing array are still arranged in three exemplary zones 47*a-c* as described above with reference to FIG. 5A. In this third example configuration, the fingerprint sensing system 3, however, also includes common-mode sensing circuitry, which is here provided in the form of at least one common-mode sensing pixel element 49*a-c* per zone 47*a-c*. Each of the common-mode sensing pixel elements 49*a-c* may include a photo-sensitive element (not shown in FIG. 6A), and an opaque structure (not shown in FIG. 6A), such as a metal layer, shielding the photo-sensitive element in the common-mode sensing circuitry 49a-c from light.

Figure 6B:
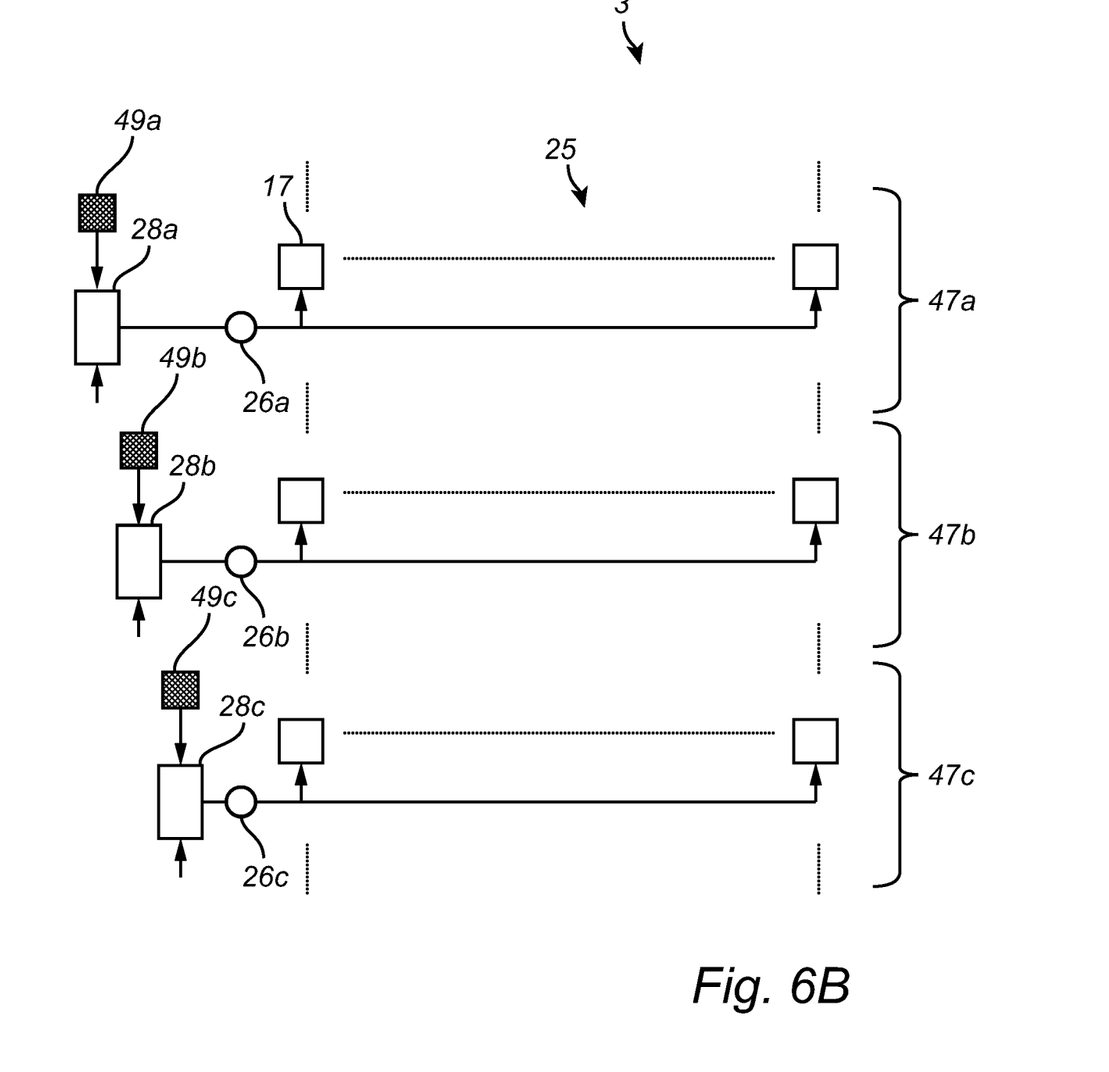

In this configuration, the above-described current source arrangement may advantageously be capable of providing a common-mode compensation current with at least different timings and based on signals from at least three different common-mode sensing circuits 49a-c for the different zones 47a-c, respectively. In addition to what was described above with reference to FIG. 5B, the control by the current control circuitry 28a-c of the controllable current sources 26a-c may additionally be based on the signals from the common-mode sensing circuitry 49a-c. The configuration of the current source arrangement 25 indicated in FIG. 6B may be replaced by the configuration of the current source arrangement 25 described above with reference to FIG. 4B.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A fingerprint sensing system for sensing a finger surface of a finger, comprising:
   a plurality of pixel elements, each pixel element in the plurality of pixel elements comprising:
   a photo-sensitive element configured to provide a current including a fingerprint signal current component and a common-mode signal current component; and
   an integrating capacitor including a first electrode coupled to the photo-sensitive element for receiving the current provided by the photo-sensitive element, and a second electrode; and
   a current source arrangement coupled to the first electrode of the integrating capacitor of each pixel element in the plurality of pixel elements,
   the current source arrangement being controllable to provide a compensation current to the first electrode of the integrating capacitor of the pixel element.

2. The fingerprint sensing system according to claim 1, wherein the current source arrangement comprises:
   a voltage source arrangement; and
   a plurality of voltage-to-current converters, each voltage-to-current converter in the plurality of voltage-to-current converters having:
   an input coupled to the voltage source arrangement; and
   an output coupled to the first electrode of the integrating capacitor comprised in a respective pixel element in the plurality of pixel elements.

3. The fingerprint sensing system according to claim 2, wherein each voltage-to-current converter is a capacitor.

4. The fingerprint sensing system according to claim 2, wherein the voltage source arrangement is configured to output a voltage that varies over time.

5. The fingerprint sensing system according to claim 4, wherein:
   in each pixel element, the integrating capacitor is coupled to the photo-sensitive element for receiving the current provided by the photo-sensitive element during a predefined integration time period; and
   the voltage source arrangement is configured to output a voltage that gradually decreases over time within the predefined integration time period.

6. The fingerprint sensing system according to claim 2, wherein the voltage source arrangement comprises:

at least one controllable voltage source; and
voltage control circuitry coupled to the at least one controllable voltage source for controlling operation of the at least one controllable voltage source.

7. The fingerprint sensing system according to claim 6, wherein:
   the fingerprint sensing circuitry further comprises common-mode sensing circuitry configured to sense at least one property influencing the common-mode signal current component;
   the voltage control circuitry is coupled to the common-mode sensing circuitry; and
   the voltage control circuitry is configured to acquire a signal from the common-mode sensing circuitry and to control operation of the at least one controllable voltage source based on the signal from the common-mode sensing circuitry.

8. The fingerprint sensing system according to claim 7, wherein the common-mode sensing circuitry includes a photo-sensitive element.

9. The fingerprint sensing system according to claim 8, further comprising an opaque structure shielding the photo-sensitive element in the common-mode sensing circuitry from light.

10. The fingerprint sensing system according to claim 8, wherein the common-mode sensing circuitry includes:
    a first photo-sensitive element arranged at a first location in relation to a given pixel element in the plurality of pixel elements; and
    a second photo-sensitive element arranged at a second location, different from the first location, in relation to the given pixel element.

11. The fingerprint sensing system according to claim 10, wherein the voltage source arrangement includes:
    a first controllable voltage source, configured to be controlled by the voltage control circuitry based on an acquired signal from the first photo-sensitive element; and
    a second controllable voltage source, configured to be controlled by the voltage control circuitry based on an acquired signal from the second photo-sensitive element.

12. The fingerprint sensing system according to claim 11, wherein:
    the first controllable voltage source is coupled to a first set of capacitors in the current source arrangement; and
    the second controllable voltage source is coupled to a second set of capacitors in the current source arrangement.

13. The fingerprint sensing system according to claim 6, wherein the fingerprint sensing system comprises an ASIC including at least the voltage control circuitry.

14. The fingerprint sensing system according to claim 2, wherein the fingerprint sensing system comprises a TFT-module including at least the plurality of pixel elements, and the plurality of capacitors in the current source arrangement.

15. An electronic device comprising:
    the fingerprint sensing system according to claim 1; and
    processing circuitry coupled to the fingerprint sensing system, and configured to perform an authentication based on fingerprint sensing signals acquired by the fingerprint sensing system.

* * * * *